United States Patent
Kinlen et al.

(10) Patent No.: US 10,541,065 B2
(45) Date of Patent: Jan. 21, 2020

(54) MULTILAYER STACK WITH ENHANCED CONDUCTIVITY AND STABILITY

(71) Applicant: The Boeing Company, Chicago, IL (US)

(72) Inventors: Patrick John Kinlen, Fenton, MO (US); Matthew Flack, St. Louis, MO (US); Eric Alan Bruton, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 15/851,002

(22) Filed: Dec. 21, 2017

(65) Prior Publication Data
US 2019/0198188 A1 Jun. 27, 2019

(51) Int. Cl.
*H01B 1/12* (2006.01)
*H01C 7/00* (2006.01)
(Continued)

(52) U.S. Cl.
CPC .............. *H01B 1/127* (2013.01); *H01B 1/121* (2013.01); *H01B 1/22* (2013.01); *H01B 1/24* (2013.01); *H01B 3/004* (2013.01); *H01B 7/02* (2013.01); *H01C 1/16* (2013.01); *H01C 7/005* (2013.01); *H01C 7/18* (2013.01); *H01C 17/06586* (2013.01); *H01C 17/24* (2013.01); *H01C 17/265* (2013.01); *H05B 3/146* (2013.01); *B64D 15/12* (2013.01); *B64D 45/02* (2013.01);
(Continued)

(58) Field of Classification Search
CPC . H01B 1/12; H01B 1/121; H01B 1/22; H01B 1/24; H01B 3/004; H01B 7/02
USPC ........................................................ 174/113 R
See application file for complete search history.

(56) References Cited

U.S. PATENT DOCUMENTS 4,942,078 A  7/1990 Newman et al.
6,377,467 B1 *  4/2002 Chu ..................... H01C 1/032
                                              361/704
(Continued)

FOREIGN PATENT DOCUMENTS

WO  WO 2015/083491  6/2015

OTHER PUBLICATIONS

Ouyang et al., "High-Conductivity Poly(3,4-Ethylenedioxythiophene): Poly(Strenesulfonate) Film and Its Application in Polymer Optoelectronic Devices", Adv. Func. Mater. 2005, 15, No. 2, Feb. 2005, p. 203-208.
(Continued)

*Primary Examiner* — Tremesha S Willis
(74) *Attorney, Agent, or Firm* — McDonnell Boehnen Hulbert & Berghoff LLP

(57) ABSTRACT

An example method includes: (i) depositing an insulating layer on a substrate; (ii) forming a conductive polymer layer on the insulating layer; and (iii) repeating deposition of a respective insulating layer, and formation of a respective conductive polymer layer to form a multilayer stack of respective conductive polymer layers interposed between respective insulating layers. Each respective conductive polymer layer has a respective electrical resistance, such that when the respective conductive polymer layers are connected in parallel to a power source, a resultant electrical resistance of the respective conductive polymer layers is less than each respective electrical resistance.

20 Claims, 6 Drawing Sheets

(51) Int. Cl.
| | |
|---|---|
| H01C 17/065 | (2006.01) |
| H01C 17/24 | (2006.01) |
| H05B 3/14 | (2006.01) |
| H01C 17/26 | (2006.01) |
| H01C 7/18 | (2006.01) |
| H01C 1/16 | (2006.01) |
| H01B 1/22 | (2006.01) |
| H01B 1/24 | (2006.01) |
| H01B 3/00 | (2006.01) |
| H01B 7/02 | (2006.01) |
| B64D 45/02 | (2006.01) |
| H01C 7/02 | (2006.01) |
| H01C 17/28 | (2006.01) |
| B64D 15/12 | (2006.01) |
| H01C 1/142 | (2006.01) |

(52) U.S. Cl.
CPC ............ *H01C 1/142* (2013.01); *H01C 7/028* (2013.01); *H01C 17/28* (2013.01); *H05B 2214/02* (2013.01)

(56) References Cited

U.S. PATENT DOCUMENTS

2005/0023974 A1* 2/2005 Chwang ............ H01L 51/5253 313/512
2006/0272857 A1 12/2006 Arnold
2007/0210073 A1 9/2007 Hubert et al.
2011/0175700 A1* 7/2011 Bourns ................ H01C 1/1406 338/20
2014/0363291 A1 12/2014 Gaillardon et al.
2016/0187985 A1* 6/2016 Lim ........................ G06F 3/016 345/173
2017/0156212 A1 6/2017 Yui et al.

OTHER PUBLICATIONS

Gao et al., "Preparation of Semi-Insulating PANI/PMMA Coating and Its Applications in Internal Charging Protection", Int. J. Adv. Manuf. Technol, Published Online Jun. 21, 2017.

Makela, et al., "Thin Polyaniline Films in EMI Shielding", Synthetic Metals 85(1997) p. 1335-1336.

Hoang, et al., "Lightweight Electromagnetic Shields Using Optimized Polyaniline Composites in the Microwave Band", Polymers for Advanced Technologies, vol. 18, Issue 4, Apr. 2007, p. 257-262, Abstract Only.

Son, et al., "Surface Graft Polymerization of Conducting Polyaniline on Waterborne Polyurethane-Urea Film and its Phenol Sensing", Journal of Applied Polymer Science, vol. 127, Issue 3, Feb. 2013, p. 1643-1652, Abstract Only.

Extended European Search Report prepared by the European Patent Office in application No. EP 18 21 2660.7 dated Jun. 4, 2019.

* cited by examiner

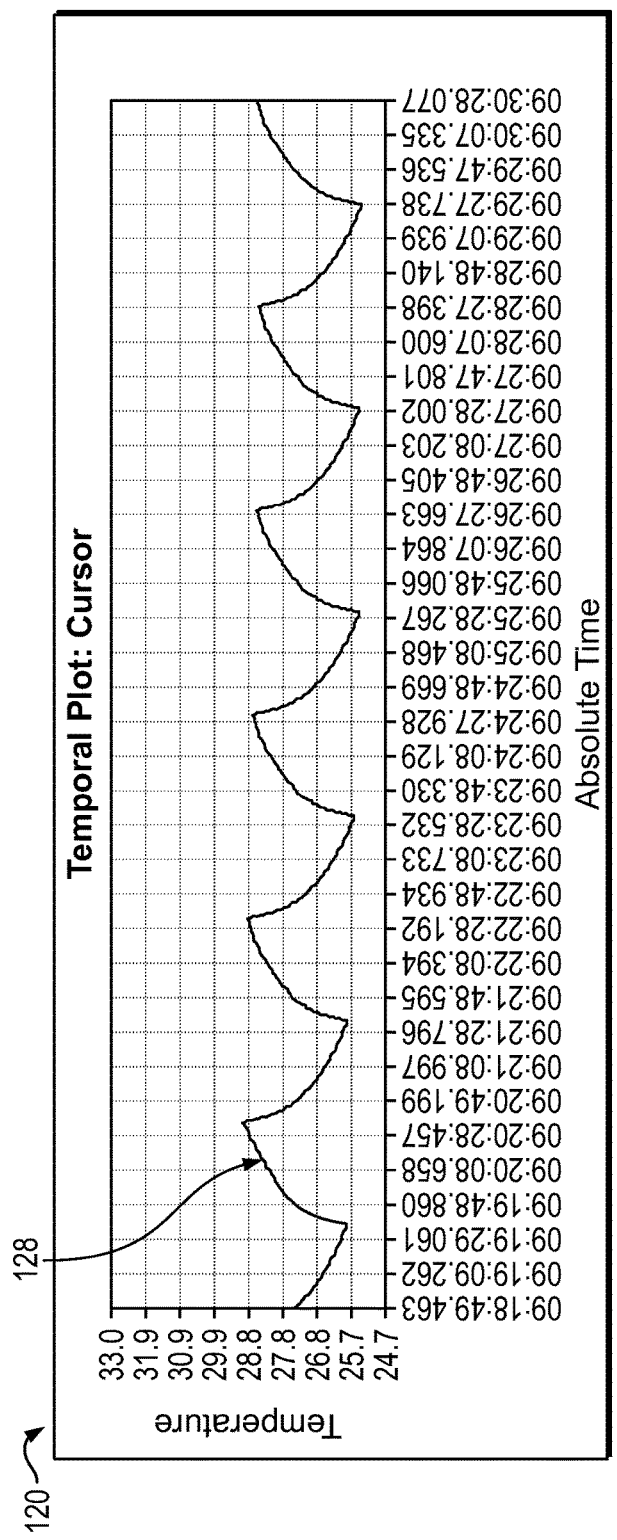
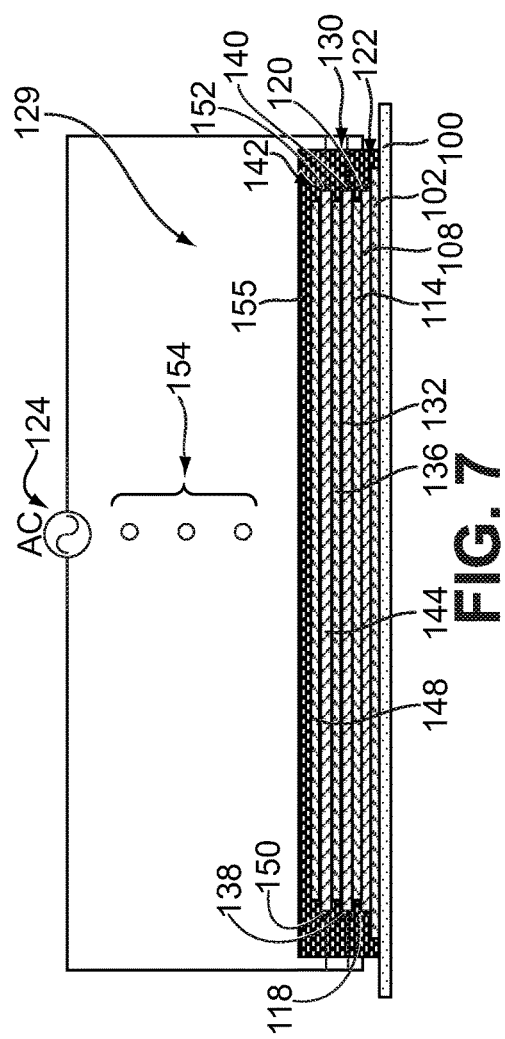
FIG. 6
FIG. 7

MULTILAYER STACK WITH ENHANCED CONDUCTIVITY AND STABILITY

FIELD

The present disclosure relates generally to enhancing conductivity of a polymer. More particularly the present disclosure relates to stacking up layers of a conductive polymer interposed between, or separated by, insulating layers to enhance conductivity and achieve a particular conductivity level and a particular electrical resistance level.

BACKGROUND

In examples, a conductive polymer is produced by an emulsion polymerization method to form an organically soluble conductive polymer. The soluble conductive polymer can then be cast into a film having a particular electrical conductivity. Electrical conductivity (or specific conductance) is a measure of the film's ability to conduct electricity. Electrical conductivity can be measured in units of Siemens per meter (S/m) or Siemens per centimeter meter (S/cm), for example. Electrical conductivity is the reciprocal of electrical resistivity, which is measured in (Ohm·m) or (Ohm·cm). For example, the film of conductive polymer may have electrical conductivity on the order of 1E-5 S/cm.

Electrical conductivity of the film may be increased by treating the film with a conductivity enhancer (e.g., isopropanol). For instance, conductivity of the film made of the conductive polymer may be increased to approximately 10 S/cm, which amounts to 6 orders of magnitude increase from the film before treatment with isopropanol.

The conductive polymer may be brittle and not suitable to some applications. To make the conductive polymer usable in particular applications, it is first rendered flexible and compatible with other materials by, for example, formulating the conductive polymer in polyurethane, epoxy, or phenoxy resins, among other example resins. Formulating conductive polymer in a resin may, for example, involve dispersing the conductive polymer in the resin to form a network of the conductive polymer therein.

However, formulating the conductive polymer in the resin reduces or degrades electrical conductivity of the conductive polymer. For instance, electrical conductivity of the conductive polymer may be reduced to lower than 1E-3 S/cm despite treatment with isopropanol. Such reduction or degradation in electrical conductivity may be undesirable.

It may thus be desirable to have films or layers of a conductive polymer that are usable in various applications without degradation to electrical conductivity of the conductive polymer films or layers. It is with respect to these and other considerations that the disclosure made herein is presented.

SUMMARY

The present disclosure describes examples that relate to multilayer stack with enhanced conductivity and stability.

In one aspect, the present disclosure describes a method. The method includes: (i) depositing an insulating layer on a substrate; (ii) forming a conductive polymer layer on the insulating layer; and (iii) repeating deposition of a respective insulating layer, and formation of a respective conductive polymer layer to form a multilayer stack of respective conductive polymer layers interposed between respective insulating layers. Each respective conductive polymer layer has a respective electrical resistance, such that when the respective conductive polymer layers are connected in parallel to a power source, a resultant electrical resistance of the respective conductive polymer layers is less than each respective electrical resistance.

In another aspect, the present disclosure describes a device. The device includes: a substrate, and a multilayer stack comprising conductive polymer layers and insulating layers disposed on the substrate disposed on the substrate. The multilayer stack includes a plurality of conductive polymer layers, each conductive polymer layer being interposed between respective insulating layers. Each conductive polymer layer has a respective electrical resistance, and a number of conductive polymer layers of the plurality of conductive polymer layers is selected such that when the conductive polymer layers are connected in parallel to a power source, a resultant electrical resistance of the conductive polymer layers is substantially equal to a predetermined electrical resistance.

In still another aspect, the present disclosure describes a component of a vehicle such as an aircraft. The component includes a multilayer stack of conductive polymer layers and insulating layers disposed on or proximate to a surface of the component. The multilayer stack includes a plurality of conductive polymer layers, each conductive polymer layer being interposed between respective insulating layers. Each conductive polymer layer has a respective electrical resistance, such that when the respective conductive polymer layers are connected in parallel to a power source coupled to the aircraft, a resultant electrical resistance of the respective conductive polymer layers is less than each respective electrical resistance.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 6 illustrates a variation of temperature at a particular location on a multilayer stack as a power source is cycled, in accordance with an example implementation.

FIG. 7 illustrates a device having a multilayer stack of respective conductive polymer layers and respective insulating layers, in accordance with an example implementation.

DETAILED DESCRIPTION

Formulating a conductive polymer in an insulating material such as resin reduces or degrades electrical conductivity of the conductive polymer despite treatment with a conductivity enhancer such as isopropanol (IPA). Such reduction or degradation in electrical conductivity may be undesirable. Within examples described herein is a multilayer stack having a conductive polymer layer treated with a conductivity enhancer and "sandwiched" or interposed between two insulating layers. An example process disclosed herein involves casting and curing a film of an insulating material such as resin (e.g., polyurethane (PUR)) followed by applying a coating of conductive polymer. The conductive polymer can then be treated with a conductivity enhancer to increase electrical conductivity of the conductive polymer layer. The treated conductive polymer layer may then be dried, and another insulating layer is applied and cured. This layer-by-layer stack-up provides a protective encapsulation of the conductive polymer from the environment and maintains the level of electrical conductivity of the conductive polymer layer.

Further, this process allows for forming a multilayer stack of conductive polymer layers and can lower overall electrical resistance of the multilayer stack. In particular, as the number of layers increases, the electrical resistance decreases per Ohm's law. As such, a multilayer stack of conductive polymer layers interposed between insulation layers can be fabricated to have a particular electrical resistance.

FIGS. 1-5 illustrate stages of fabricating a multilayer stack, in accordance with an example implementation. The illustrations shown in FIGS. 1-5 are generally shown in cross-sectional views to illustrate sequentially formed layers developed to create the multilayer stack. The layers can be developed by microfabrication and/or manufacturing techniques such as, for example, electroplating, photolithography, deposition, and/or evaporation fabrication processes, spin coating, spray coating, roll-to-roll coating, ink jet, direct-write, among other possible deposition or forming techniques.

Further, in examples, the various materials of the layers may be formed according to patterns using photoresists and/or masks to pattern materials in particular arrangements. Additionally, electroplating techniques can also be employed to coat ends or edges of conductive polymer layers with electrical contacts (e.g., metallic pads or electrical leads). For example, an arrangement of conductive material formed by a deposition and/or photolithography process can be plated with a metallic material to create a conductive electrical contact.

The dimensions, including relative thicknesses and widths, of the various layers illustrated and described in connection with FIGS. 1-5 to create a multilayer stack are not illustrated to scale. Rather, the drawings in FIGS. 1-5 schematically illustrate the ordering of the various layers for purposes of explanation only.

Figure 1:
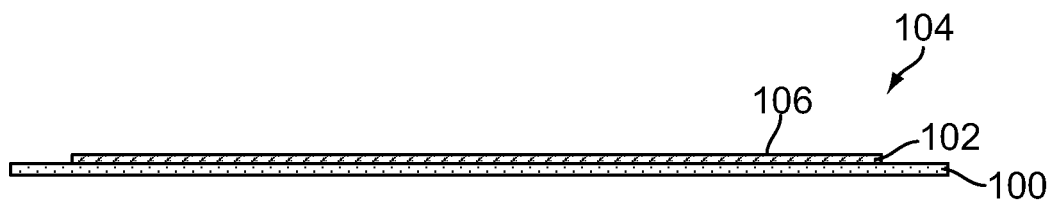
FIG. 1 illustrates a substrate with an insulating layer formed on the substrate to provide a partially-fabricated multilayer stack, in accordance with an example implementation.

FIG. 1 illustrates a substrate 100 with an insulating layer 102 formed on the substrate 100 to provide a partially-fabricated multilayer stack 104, in accordance with an example implementation. In some examples, the insulating layer 102 can adhere to the substrate 100. In examples, the insulating layer 102 can be configured to facilitate forming a conductive polymer layer thereon, such that the conductive polymer layer adheres to the insulating layer 102.

As examples, the substrate 100 can be made out of an epoxy resin, a composite structural material (e.g., of a wing, blade, or any component of an aircraft), thermoplastic resin, thermoset material, a polycarbonate material, etc. The substrate 100 can be cleaned before forming the insulating layer 102. The substrate 100 may be cleaned in a variety of ways such as soaking in a first fluid, rinsing with a second fluid, and drying with a gas. In some examples, the first fluid can include a solvent, such as acetone. Moreover, in some examples, the second fluid can include isopropyl alcohol. Further, in some examples, the gas can include nitrogen. Rinsing may be performed in a variety ways, such as soaking in a bath in a tank, an automated spray, manually via a squirt bottle, etc.

In examples, the substrate 100 can be baked before forming the insulating layer 102. The substrate 100 may be baked at a particular temperature for a time period. For example, the temperature can be 90 degrees Celsius (C) and the time period may be 2 minutes. In other examples, the substrate 100 can be plasma cleaned before forming the insulating layer 102. The substrate 100 may be plasma-cleaned at a particular power level for a time period.

The insulating layer 102 can be formed, for example, of a resin material. Example resin materials include epoxy, thermoplastic resins, phenolic resins, or silicone resins, which are characterized in being durable and operable under elevated temperatures. It may be desirable to configure the insulating layer 102 of a thermostable resin material. As a specific example, the insulating layer 102 can be made of PUR, which is a polymer composed of organic units joined by carbamate (urethane) links. PUR can be a thermosetting polymer or a thermoplastic polymer. PUR can be formed by reacting a di- or poly-isocyanate with a polyol. PUR is described herein as an example for illustration, and other types of resin could be used to make the insulating layer 102.

The insulating layer 102 can be deposited on the substrate 100 in a variety of ways such as brushing, painting, patterning, printing, any additive manufacturing method, etc. In examples, after forming the insulating layer 102 on the substrate 100, the insulating layer 102 may be cured (e.g., cured at a particular temperature such as 70 C). Curing may involve toughening or hardening of the insulating material by heat or chemical additives, among other processes. Curing can be partial or can be full depending on the application and implementation. The insulating layer 102 can have a surface 106 configured to receive a conductive polymer layer as described next.

Figure 2:
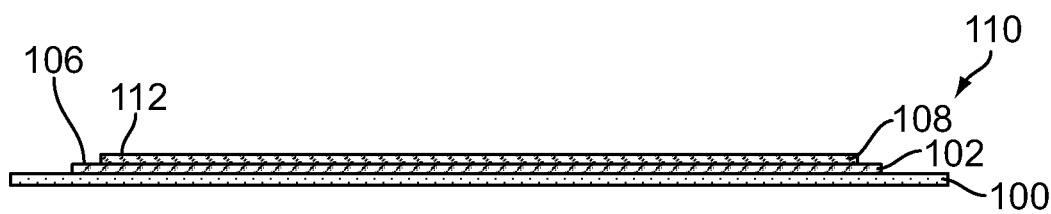
FIG. 2 illustrates a conductive polymer layer formed on the insulating layer to provide a partially-fabricated multilayer stack, in accordance with an example implementation.

FIG. 2 illustrates a conductive polymer layer 108 formed on the insulating layer 102 to provide a partially-fabricated multilayer stack 110, in accordance with an example implementation. The conductive polymer layer 108 can be made of any of several conductive polymers. For example, the conductive polymer layer 108 can be made of polyaniline (PANT), poly(ethylenedioxythiophene) (PEDOT), poly(styrenesulfonate) (PSS), dodecylbenzene sulfonic acid (DBSA), Dinonylnaphthylsulfonic acid (DNNSA), Polypyrrole (PPy), mixtures thereof, or salts thereof. In other examples, the conductive polymer layer 108 could be made of graphene paint, carbon nanotubes paint, carbon black paint, conductive oxides, or conductive paints containing metal or metallic particles.

In examples, the conductive polymer layer 108 could be made of an intrinsically conducting polymer (ICP). ICPs include synthetic organic polymers configured to conduct electricity. In other examples, the conductive polymer layer 108 could be made of an extrinsically conducting polymer. An extrinsically conducting polymer is obtained by adding specific additives (e.g., metallic particle fillers) to a naturally insulating polymer to render such an insulting polymer electrically conductive.

As a specific example for illustration, the conductive polymer layer 108 can be made of Polyaniline-Dinonylnaphthalene sulfonic acid (PANI-DNNSA). PANI is a conducting polymer of the semi-flexible rod polymer family, and is characterized by high electrical conductivity. DNNSA is an organic chemical, e.g., an aryl sulfonic acid. In examples, DNNSA has a melting point of 259.5 C and a boiling point of 600.4 C. DNNSA is stable above 100 C. DNNSA can be prepared by reaction of naphthalene with nonene, yielding diisononylnaphthalene. Diisononylnaphthalene then undergoes sulfonation. DNNSA can be added to a PANI fluid to increase the electrical conductivity of the fluid. PANI-DNNSA is used herein as example; however, any other conductive polymer, such as the conductive polymers, mentioned above could be used.

In an example, the conductive polymer can be produced by an emulsion polymerization method to form an organically soluble conductive polymer. The organically soluble conductive polymer can then be mixed with toluene, for example. Toluene is a colorless, water-insoluble liquid that operates as a solvent. Toluene is a mono-substituted benzene derivative, having a $CH_3$ group attached to a phenyl group. In this example, the conductive polymer in toluene may be applied or deposited to the surface 106 of the insulating layer 102 to form the conductive polymer layer 108 shown in FIG. 2.

In an example, the conductive polymer layer 108 in toluene may be brushed on the surface 106 of the insulating layer 102 to form a uniform layer thereon so as to have consistent electrical resistance over the substrate 100. Other depositing techniques could be used to form the conductive polymer layer 108 on the insulating layer 102. For instance, the conductive polymer layer 108 may be formed by a microfabrication process such as chemical vapor deposition, spin coating, spray coating, roll-to-roll coating, ink jet printing, patterning, direct-write. For example, the conductive polymer material may be spin coated by placing the conductive polymer material on the partially-fabricated multilayer stack 104, applying a spread cycle, applying a spin cycle, and applying a deceleration cycle.

In examples, the conductive polymer layer 108 may be deposited onto the insulating layer 102 with a substantially uniform thickness such that a surface of the conductive polymer layer 108 is substantially flat. In some examples, the conductive polymer layer 108 can be configured as a conformal coat.

An adhesion promoter can be applied to the surface 106 of the insulating layer 102 before the conductive polymer layer 108 is formed. With such an arrangement, adhesion of the conductive polymer layer 108 to the insulating layer 102 may be improved. In some examples, the adhesion promoter can comprise 3-methacryloyloxypropyltrimethoxysilane, and in other examples, the adhesion promoter may comprise hexamethyldisilazane (HDMS), which can enhance adhesion of the conductive polymer layer 108 to the insulating layer 102. Other adhesion promoters are possible as well.

The adhesion promoter may be applied in a variety of ways such as spin coating at a particular rate (e.g., 3000 rpm), baking at a temperature for a first time period, rinsing with a fluid (e.g., IPA), and baking at the temperature for a second time period. In such examples, applying the adhesion promoter by spin coating may involve accelerating and/or decelerating the partially-fabricated multilayer stack 104. Other application methods of the adhesion promoter are possible. Moreover, the partially-fabricated multilayer stack 104 can be cleaned (e.g., via rinsing or plasma cleaning) before applying the adhesion promoter to the surface 106 of the insulating layer 102.

The surface 106 of the insulating layer 102 can be treated, such that the conductive polymer layer 108 bonds to the treated surface during formation of the conductive polymer layer 108. The surface 106 may be treated in a variety of ways such as by etching using an inductively coupled plasma.

The conductive polymer layer 108 can be dried at a particular temperature, and treated with a conductivity enhancer to enhance electrical conductivity of the conductive polymer layer 108. An example conductivity enhancer can include a morphology enhancer such as IPA. In this example, to enhance electrical conductivity of the conductive polymer layer 108, the conductive polymer layer 108 may be rinsed several times with IPA. The conductive polymer layer 108 (e.g., PANI-DNNSA) can be treated with IPA using other methods. In other examples, the conductive polymer layer 108 can be treated with a band modifier to enhance electron hole mobility, and thus enhance electrical conductivity of the conductive polymer layer 108. Other conductivity enhancers could be used as well.

As described above, the conductive polymer layer 108 is formed on the insulating layer 102 such that the conductive polymer layer 108 adheres to the insulating layer 102. Because the insulating layer 102 is interposed between the conductive polymer layer 108 and the substrate 100, the conductive polymer layer 108 need not be configured to adhere to a material of the substrate 100. With this configuration, the conductive polymer layer 108 is not formulated in a resin, and thus the electrical conductivity of the conductive polymer layer 108, which may be enhanced by treatment with a conductivity enhancer, is not degraded.

In examples, the conductive polymer layer 108 may have a thickness less than 10 one thousandth of an inch (i.e., less than 10 mil.). However, other thicknesses are possible. The conductive polymer layer 108 can have a surface 112 configured to receive another insulating layer as described next.

Figure 3:
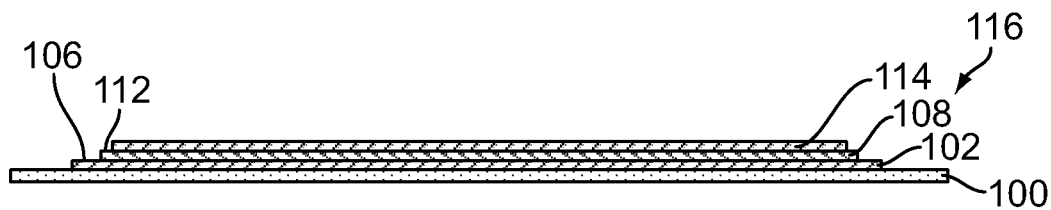
FIG. 3 illustrates another insulating layer formed on the conductive polymer layer to provide a partially-fabricated multilayer stack, in accordance with an example implementation.

FIG. 3 illustrates another insulating layer 114 formed on the conductive polymer layer 108 to provide a partially-fabricated multilayer stack 116, in accordance with an example implementation. The insulating layer 114 can comprise another resin layer similar to the insulating layer 102. In an example, the insulating layer 114 may be diluted with a solvent such as dimethylcarbonate to give a 20% mass/mass (w/w) solution.

The insulating layer 114 can be applied to the surface 112 of the conductive polymer layer 108 in a similar manner to applying the insulating layer 102 to the substrate 100. As such, the insulating layer 114 may be spin coated, brushed, patterned, printed, etc. on the surface 112. An adhesion promoter can be applied to the surface 112 to facilitate adhesion of the insulating layer 114 to the surface 112 of the conductive polymer layer 108. The insulating layer 114 can then be cured at a particular temperature (e.g., 70 C).

Figure 4:
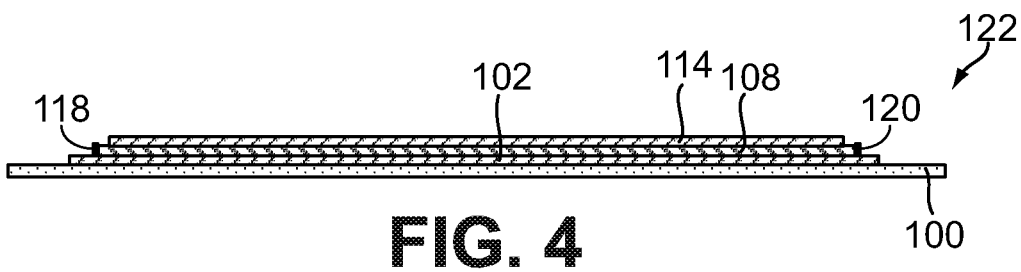
FIG. 4 illustrates electrical contacts formed on edges of the conductive polymer layer to provide a multilayer stack, in accordance with an example implementation.

FIG. 4 illustrates electrical contacts 118, 120 formed on edges of the conductive polymer layer 108 to provide a multilayer stack 122, in accordance with an example implementation. The electrical contact 118 can be formed at a first lateral edge or end of the conductive polymer layer 108, whereas the electrical contact 120 can be formed at a second lateral edge or end, opposite the first lateral edge or end, of the conductive polymer layer 108.

Each of the electrical contacts 118, 120 can be formed independently as a piece of electrically conductive material made of a metal. For instance, the electrical contacts 118, 120 could be configured as metal (e.g., silver or gold alloy) pads. However, the electrical contacts 118, 120 could take other forms such as an electrical lead or a wire.

The electrical contacts 118, 120 may be sprayed, brushed, patterned (printed) or deposited at the lateral ends or edges of the conductive polymer layer 108 via other techniques. The electrical contacts 118, 120 can then be used to connect a power source (direct current or alternating current source) to the conductive polymer layer 108. In examples, electrical connections between the electrical contacts 118, 120 and the power source could be made using conductive inks or metals applied with evaporation or cold-spray techniques.

Figure 5:
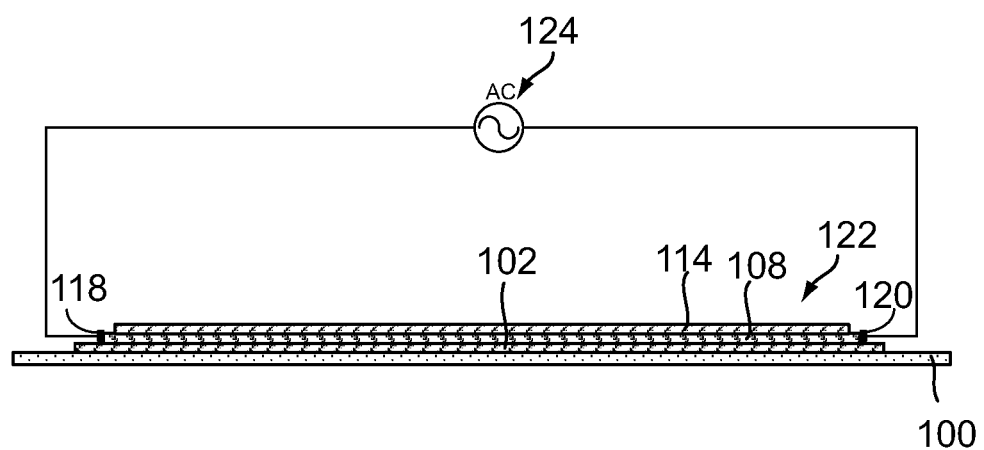
FIG. 5 illustrates a power source coupled to a multilayer stack, in accordance with an example implementation.

FIG. 5 illustrates a power source 124 coupled to the multilayer stack 122, in accordance with an example implementation. The power source 124 is depicted as an alternating current (AC) source; however, other types of power sources could be used.

With this configuration, the conductive polymer layer 108 can operate as an electrical resistance. In other words, the conductive polymer layer 108 has a particular electrical conductivity based on the amount of conductive material in the conductive polymer layer 108, a thickness of the conductive polymer layer 108, and treatment with a conductivity enhancer. As electric current flows through the conductive polymer layer 108, heat is generated. In particular, due to the electrical resistance of the conductive polymer layer 108 (i.e., resistance to motion of electrons), electrons of the electric current bump into atoms within the conductive polymer layer 108, and thus some of the kinetic energy of the electrons is transferred to the atoms of the conductive polymer layer 108 as thermal energy. This thermal energy causes the conductive polymer layer 108 to be heated. As such, electric power from the power source 124 is dissipated as thermal energy from the conductive polymer layer 108.

In a specific experimental implementation, the substrate 100 is made of a 3 inches by 5 inches polycarbonate substrate. The insulating layer 102 is then applied as a PUR coating via a brush to the polycarbonate substrate, and the PUR coating is then cured at 70 degrees C. PANI-DNNSA in toluene is then applied via a brush to the surface of the PUR coating to form the conductive polymer layer 108, and then the PANI-DNNSA layer is dried at 70 degrees C. Another layer of PUR (diluted with dimethylcarbonate to give a 20% weight per weight (% w/w) solution) is then applied to the surface of the PANI-DNNSA layer to form the insulating layer 114, and is then cured at 70 degrees C. Silver contacts are then applied to edges of the PANI-DNNSA layer. With this specific implementation, the PANI-DNNSA layer may have or may cause an electrical resistance of approximately 1,600 ohms between the silver contacts.

With this specific experimental implementation, the multilayer stack is connected to an AC voltage power source to test its electrical heating capability. The voltage applied is 94.5 volts and the current measured is 60.84 mill amperes, thus yielding a 6 watt heater. These numbers and configurations are examples for illustration only. Other dimensions, sizes, and techniques could be used based on an application in which the multilayer stack is to be used and the electrical resistance to be generated.

FIG. 6 illustrates a variation of temperature at a particular location on the multilayer stack as a power source is cycled, in accordance to an example implementation. In particular, FIG. 6 depicts a plot 126 with temperature in Celsius represented on the y-axis and absolute time on the x-axis. Curve 128 illustrates temperature variation at the particular location as voltage of the power source is cycled on and off at 20 second intervals and the temperature monitored with a thermal camera. No degradation is detected over a two hour cycling period. In other words, the temperature level reached for each cycle is not varied or reduced over time.

This layer-by-layer stack-up shown in FIGS. 1-5 provides several advantages. For example, with the configuration shown in FIG. 5, the conductive polymer layer 108 is provided in a protective encapsulation between two insulating layers 102, 114 to protect the conductive polymer layer 108 from its environment. Also, with this configuration, the conductive polymer layer 108 is not formulated in a resin, but is rather formed as an independent polymer layer interposed between the two insulating layers 102, 114. Thus, if the conductive polymer layer 108 is treated by a conductive enhancer to increase its electrical conductivity, the enhanced electrical conductivity is not degraded because the conductive polymer layer 108 is not formulated in a resin.

Moreover, as mentioned above, the conductive polymer layer 108 is adhered to the insulating layers 102, 114 rather than the substrate 100, and thus the conductive polymer layer 108 need not be configured to adhere to a material of the substrate 100. In other words, the conductive polymer layer 108 is configured to adhere to the material of the insulating layers 102, 114, whereas the insulating layers 102, 114 are configured to adhere to the material of the substrate 100. As such, the chemical composition and processing of the conductive polymer layer 108 may be simplified because the conductive polymer layer 108 need not have chemical formulations that facilitate adhesion to the substrate 100.

Further, the multilayer stack 122 represents a modular stack-up that can be repeated to reduce electrical resistance level to a particular or predetermined electrical resistance. FIG. 7 illustrates a device 129 having a multilayer stack of respective conductive polymer layers and respective insulating layers, in accordance with an example implementation. The multilayer stack of the device 129 includes several modular multilayer stacks similar to the multilayer stack 122. In other words, several multilayer stacks similar to the multilayer stack 122 can be stacked. As shown in FIG. 7, in addition to the multilayer stack 122, other multilayer stacks could be added to achieve a particular electrical resistance. For instance, multilayer stack 130 could be stacked above the multilayer stack 122 to achieve a lower electrical resistance as described below. The multilayer stack 130 includes a conductive polymer layer 132 "sandwiched" or interposed between the insulating layer 114 and an insulating layer 136.

The conductive polymer layer 132 may have electrical contacts 138, 140 formed on edges of the conductive polymer layer 132. The electrical contacts 138, 140 may be similar to the electrical contact 118, 120. In examples, electrical connections can be made between the electrical contacts 138, 140 and the power source 124 using conductive inks or metals applied with evaporation or cold-spray technologies.

With the configuration shown in FIG. 7, the conductive polymer layer 108 and the conductive polymer layer 132 operate as two electrical resistances that are connected in parallel to the power source 124. As such, a total or resultant resistance $R_t$ of the conductive polymer layer 108 and the conductive polymer layer 132 can be calculated using Ohm's law as follows:

$$\frac{1}{R_t} = \frac{1}{R_1} + \frac{1}{R_2} \quad (1)$$

where $R_1$ is the electrical resistance of the conductive polymer layer 108 and $R_2$ is the electrical resistance of the conductive polymer layer 132. For example, if $R_1$ is 1,600 Ohms and $R_2$ is 1,600 Ohms, then $R_t$ can be calculated as 800 Ohms, which is half the electrical resistance of $R_1$ or $R_2$.

By stacking more multilayer stacks similar to the multilayer stack 130, the total or resultant electrical resistance can further be reduced. For example, a multilayer stack 142 could be stacked above the multilayer stack 130. The multilayer stack 142 includes a conductive polymer layer 144 "sandwiched" or interposed between the insulating layer 136 of the multilayer stack 130 and an insulating layer 148. The insulating layers 102, 114, 136, and 148 could be referred to as respective insulating layers to indicate that the insulating layers are separate and can be formed subsequent to each other. For instance, the insulating layer 114 can be formed subsequent to forming the insulating layer 102; the insulating layer 136 can be formed subsequent to forming the insulating layer 114; and the insulating layer 148 can be formed subsequent to forming the insulating layer 136.

The conductive polymer layer 144 may have electrical contacts 150, 152 formed on edges of the conductive polymer layer 144. The electrical contacts 150, 152 may be similar to the electrical contact 118, 120 and the electrical contacts 138, 140. In examples, electrical connections can be made between the electrical contacts 150, 152 and the power source 124 using conductive inks or metals applied with evaporation or cold-spray technologies.

With the configuration shown in FIG. 7, the conductive polymer layer 108, the conductive polymer layer 132, and the conductive polymer layer 144 operate as three electrical resistances that are connected in parallel to the power source 124. As such, the total or resultant resistance $R_t$ of the conductive polymer layer 108, the conductive polymer layer 132, and the conductive polymer layer 144 can be calculated using Ohm's law as follows:

$$\frac{1}{R_t} = \frac{1}{R_1} + \frac{1}{R_2} + \frac{1}{R_3} \quad (2)$$

where $R_3$ is the electrical resistance of the conductive polymer layer 144. For example, if $R_1=R_2=R_3=1,600$ Ohms, then $R_t$ can be calculated by equation (2) as approximately 533.33 Ohms, which is one third the electrical resistance of $R_1$, $R_2$, or $R_3$.

Thus, with this configuration, a predetermined resultant electrical resistance can be achieved by stacking more multilayer stacks. In other words the steps of depositing an insulating layer and forming a conductive polymer layer can be repeated to add more multilayer stacks to cause the device 129 to have the predetermined resultant electrical resistance when the power source 124 is connected thereto.

Adding more multilayer stacks is depicted schematically in Figure by dots 154. More multilayer stacks can be added on top of the multilayer stack 142 until a predetermined electrical resistance or predetermined electrical conductivity is achieved. As the number of multilayer stacks increases, the overall resultant electrical resistance decreases per Ohm's law:

$$\frac{1}{R_t} = \frac{1}{R_1} + \frac{1}{R_2} + \frac{1}{R_3} \cdots \frac{1}{R_n} \quad (3)$$

where $R_t$ is the total or resultant resistance and $R_1 \ldots R_n$ are the resistances of the individual multilayer stacks 122, 130, 142 . . . etc. The resultant resistance is less than each respective electrical resistance $R_1 \ldots R_n$.

As such, the multilayer stacks 122, 130, 142 shown in FIG. 7 comprise a plurality of conductive polymer layers 108, 132, 144 sandwiched or interposed between insulating layers 102, 114, 136, 148. This configuration enables using multiple conductive polymer layers rather than a single thick conductive polymer layer. A thin conductive polymer layer is easier to cast into uniform-thickness layer compared to a thick conductive polymer layer. Further, a thin conductive polymer layer is more flexible and has less electric resistance compared to a thick conductive polymer layer. The configuration allows for tuning electrical resistance and electrical conductivity. By adding more stacks, electrical resistance is decreased and electrical conductivity is increased, and vice versa.

As described above, the device 129 can be configured to have different resistivity, and thus different amounts of heat generated, at different locations of the device 129 (e.g., at different locations on the substrate 100). For example, a different number of layers can be used at different locations. Having more conductive polymer layers at one location may indicate that the electrical resistance at that location can be lower than a respective electrical resistance at a different location having fewer conductive polymer layers. As a result of using different number of layers at different locations, a heating gradient can be generated across the substrate 100. Such arrangement can be implemented by patterning (e.g., printing) a different number of layers at various locations to enable some locations to be hotter than others.

In another example, the same number of layers can be used across the device 129; however, different conductive polymer materials having different electrical conductivities can be used at different locations to provide different electrical resistance. As a result, different electrical resistance can be generated at different locations of the device 129 and a heating gradient can be generated, e.g., to generate a different amount of heat at different locations of the device 129.

In another example, a thickness of a conductive polymer layer at one location of the device 129 may be different than a respective thickness of a conductive layer at another location. The different thickness can indicate different electrical conductivity and different electrical resistances at different locations of the device 129. In another example, the conductive polymer layers at one location can be treated by a conductivity enhancer while conductive polymer layers at another location might not be treated with, or may be treated with a different conductivity enhancer. Thus, several techniques can be used to modify the conductivity and resistivity over the substrate 100 including using different number of layers, different materials for the conductive polymer layers, different thicknesses for the conductive polymer layers, using a conductivity enhancer at some locations while using no or a different conductivity enhancer at other locations, among other possible techniques.

Further, the device 129 can be configured as an addressable matrix of conductive polymer layers to selectively activate a subset of conductive polymer layers as desired. For example, electrical connections can be made between the electrical contacts of the conductive polymer layers and the power source 124 using independently actuatable switches. For instance, a controller of the device 129 may be coupled to the switches that connect individual electrical contacts (e.g., the electrical contacts 118, 120, 13, 140, 150, 152, etc.) to the power source 124. The controller may then activate a particular number of switches to connect a particular number of conductive polymer layers to the power source 124 and achieve a predetermined or a target electrical resistance. If more switches, and thus more conductive polymer layers, are activated, then a lower electrical resistance and a lower amount of heat are generated compared to when fewer switches are activated.

In some examples, an encapsulation layer or encapsulation package 155 may be formed about the device 129. The encapsulation package 155 can provide protection to the device 129 from its environment. In an example, the encapsulation package 155 may be configured as a conformal insulating coating of polyurethane, polyimide, polyester, or epoxy that is applied to a surface of the multilayer stack by spray, dip coating, screen printing, etc. The encapsulation package 155 can then be cured via ultraviolet light or may be thermally cured. In another example, the encapsulation package 155 can comprise a polymer film (e.g., polyurethane, polyimide, polyester, etc.) that is to a surface of the multilayer stack using a pressure sensitive adhesive that bonds to the surface of the multilayer stack. These examples are for illustration only and other materials and configuration are possible for the encapsulation package 155.

In the implementation described above, and shown in FIGS. 1-5 and 7, the substrate 100 is shown to be flat. However, this is not meant to be limiting. In examples, the substrate could be configured to be non-flexible and flat; however, in other examples, the substrate could be flexible and form a curved surface upon which the various other layers are deposited.

The multilayer stack, similar to the multilayer stack of the device 129 shown in FIG. 7, could be used in a variety of applications. As an example application, the multilayer stack could be used for de-icing of a component (e.g., wing, blade, or any other part) of an aircraft, rotorcraft, wind turbine, etc. The substrate (e.g., the substrate 100) in this example could be a composite structure of the component of the aircraft, rotor craft, wind turbine, etc. The various layers of the multilayer stack could then be printed on the composite structure of the component of the aircraft.

Figure 8:
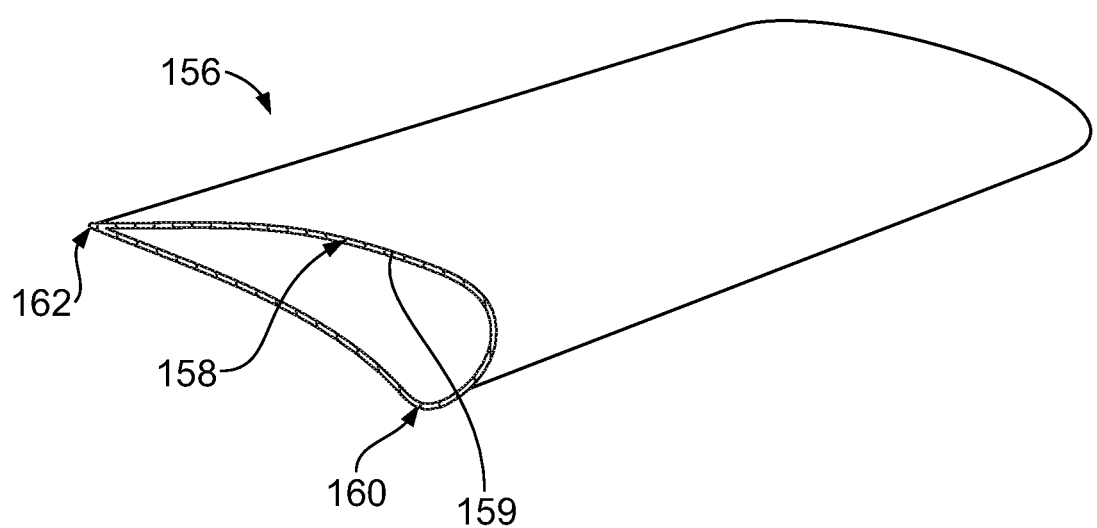
FIG. 8 illustrates a component of an aircraft with a multilayer stack deposited on the component, in accordance to an example implementation.

FIG. 8 illustrates a component 156 of an aircraft with a multilayer stack 158 deposited on or proximate to a surface 159 of the component 156, in accordance to an example implementation. The component 156 of the aircraft may, for example, represent a wing, a blade, or any other component of an aircraft. When a power source is connected to the electrical contacts of the conductive polymer layers of the multilayer stack 158, heat is generated for de-icing (i.e., melt any ice or snow accumulated about the component 156) or anti-icing (i.e., prevent ice from forming on the component 156). Distinct layers of the multilayer stacks 158 are not shown in FIG. 8 to reduce visual clutter in the drawing. However, it should be understood that the multilayer stack 158 is similar to the multilayer stack of the device 129 shown in FIG. 7.

In examples, the multilayer stack 158 could be deposited on the surface 159 of the component 156. In these examples, other protective layers could be deposited on top of the multilayer stack 158 for environmental protection and durability. In other examples, the multilayer stack 158 may be disposed within the component 156 proximate to the surface of the component 156, e.g., within a predetermined distance from the surface 159, so as to heat the surface of the component 156 and cause the ice to melt. In an example, the predetermined distance could range between 0.1 millimeter and 5 millimeter depending on thermal conductivity of the protective layers that separate the multilayer stack 158 from the surface of the component 156. By being proximate to the surface of the component 156, a lesser amount of heat can melt ice or prevent ice from forming, compared to a configuration where the multilayer stack 158 is disposed deeper within the component 156 away from its surface.

In examples, some portions of the component 156 may be more susceptible to icing than others, and in these examples any of the techniques described above could be used to vary the electrical resistance and the amount of heat generated at various locations on the on the component 156. For instance, if ice is melted off a leading edge 160 of the component 156, the ice could then move and refreeze at a trailing edge 162 of the airfoil (e.g., wing or blade). In this example, it may be desirable to have larger electric resistance at the leading edge 160 compared to the trailing edge 162, and thus more heat would be generated at the leading edge 160. As mentioned above, such variation in electrical resistance could be achieved by using a different number of conductive polymer layers, different materials for the conductive polymer layers, different thicknesses for the conductive polymer layers, or using a conductivity enhancer at one location while using no or a different conductivity enhancer at another location. As such, ice can be melted at the leading edge 160 rather than being allowed to move to and refreeze at the trailing edge 162.

Additionally or alternatively, the multilayer stack could be used for dissipating lightning strikes that impact an aircraft. As mentioned above with respect to FIG. 8, the substrate (e.g., the substrate 100) could be a composite structure of the aircraft. The various layers of the multilayer stack could then be deposited at particular locations of the aircraft (e.g., at the wing tips, tail, nose, etc.) where a lightning strike can occur.

The electrical contacts of the conductive polymer layers of the multilayer stacks could be coupled to electrodes disposed at the particular locations of the aircraft where a lightning may impact the aircraft (e.g., at the nose, wing tips, tails, etc.). The conductive polymer layers could then form a conductive path that electrically connects a portion of the aircraft where the lightning strike impacts the aircraft to another location of the aircraft where the electrical charge of the lightning strike is discharged. In other words, the electric current generated by the lightning strike could be guided by the conductive polymer layers from one location of the aircraft where the lightning strike impacts the aircraft to another location to be discharged.

The electrical resistance of the conductive polymer layers can cause the electrical charge of the lightning strike to be dissipated as heat generated from the electric current generated by the lightning strike passing through the conductive polymer layers. In examples, if some layers of the multilayer stacks are affected by the heat generated or the electric current of the lightning strike, the multilayer stack can be repaired by depositing new layers to restore expected performance (e.g., the level of electrical conductivity or electrical resistance expected from the multilayer stack).

The multilayer stack could also be used for shielding electronic components from electromagnetic interference (EMI). For instance, in some applications, electronic components (e.g., circuit boards) may be disposed within a housing. To shield the electronic components from EMI, the housing could be made of a plastic material configured to be the substrate (e.g., the substrate 100) of the multilayer stack.

Electromagnetic waves surrounding the housing could generate an electric current in the conductive polymer layers, and thus the electromagnetic energy of the electromagnetic waves is dissipated as heat generated by the conductive polymer layers. Further, in this example, the insulating layers of the multilayer stack operate as insulators that preclude electromagnetic waves from penetrating the housing. As such, the conductive polymer layers dissipate the electromagnetic energy, whereas the insulating layers preclude the electromagnetic waves from penetrating the housing, and thus the electronic components within the housing are protected from EMI.

Figure 9:
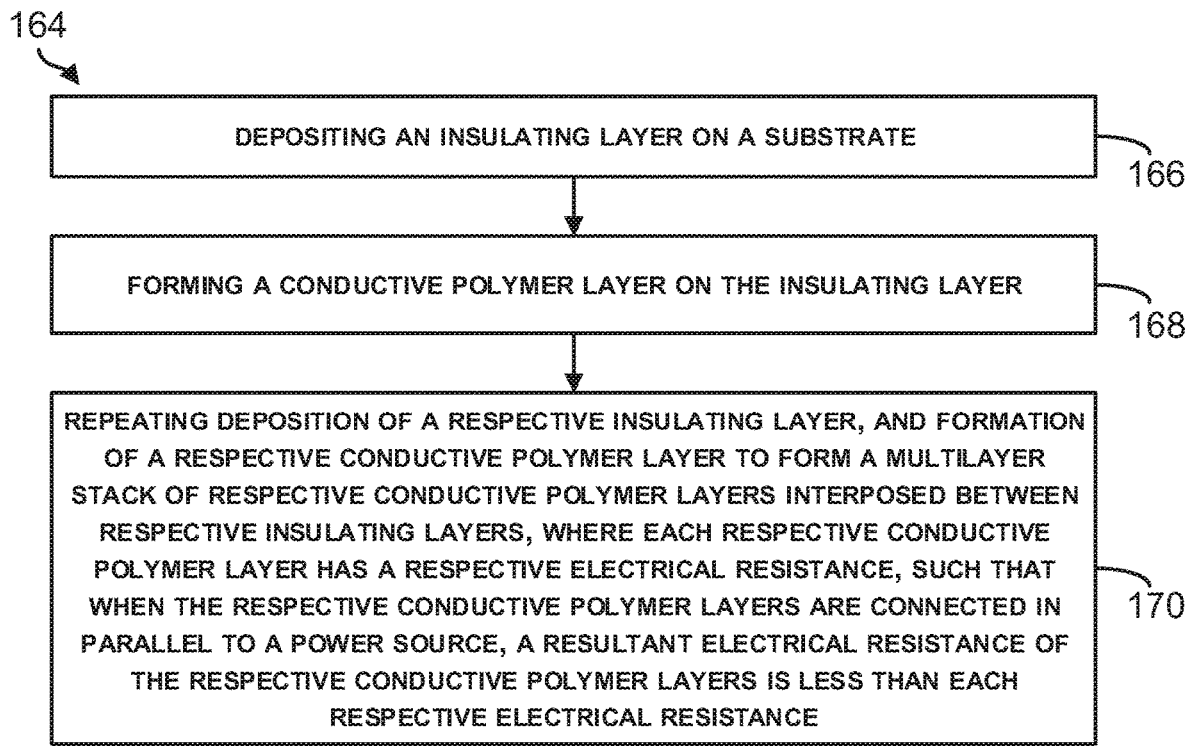
FIG. 9 is a flowchart of a method for forming a multilayer stack of conductive polymer layers and insulating layers, in accordance with an example implementation.

FIG. 9 is a flowchart of a method 164 for forming a multilayer stack of conductive polymer layers and insulating layers, in accordance with an example implementation. The method 164 presents an example of a method that could be used to form a multilayer stack of conductive polymer layers interposed between respective insulating layers, such as the multilayers stack of the device 129, for example. The method 164 can include one or more operations, functions, or actions as illustrated by one or more of blocks 166-184. Although the blocks are illustrated in a sequential order, these blocks may also be performed in parallel, and/or in a different order than those described herein. Also, the various blocks can be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art At block 166, the method 164 includes depositing an insulating layer (e.g., the insulating layer 102) on a substrate (e.g., the substrate 100).

At block 168, the method 164 includes forming a conductive polymer layer (e.g., the conductive polymer layer 108) on the insulating layer (e.g., the insulating layer 102).

At block 170, the method 164 includes repeating deposition of a respective insulating layer, and formation of a respective conductive polymer layer to form a multilayer stack of respective conductive polymer layers interposed between respective insulating layers (e.g., forming the conductive polymer layers 132, 144 interposed between the insulating layers 114, 136 and between the insulating layers 136, 148 to form the multilayer stack of the device 129 shown in FIG. 7). Each respective conductive polymer layer has a respective electrical resistance, such that when the respective conductive polymer layers are connected in parallel to a power source (e.g., the power source 124), a resultant electrical resistance of the respective conductive polymer layers is less than each respective electrical resistance.

The operations many include forming the conductive polymer layer to include an intrinsic or extrinsic conductive polymer, or a mixture thereof. The operation of depositing the insulating layer may include depositing a resin layer including polyurethane, epoxy, thermoplastic, phenolic, or silicone material. Further, the operation of forming the conductive polymer layer may include forming a layer of PANI-DNNSA, PEDOT-PSS, PANI-DBSA, polypyrrole, graphene paint, carbon nanotubes paint, carbon black, conductive oxide, or metallic particles.

Figure 10:
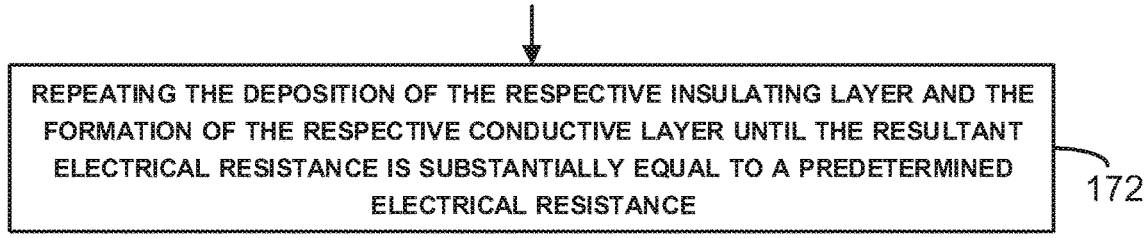
FIG. 10 is a flowchart of additional operations that may be performed with the method of FIG. 9, in accordance with an example implementation.

FIG. 10 is a flowchart of additional operations that may be executed and performed with the method 164, in accordance with an example implementation. At block 172, operations include repeating the deposition of the respective insulating layer and the formation of the respective conductive layer until the resultant electrical resistance is substantially equal to a predetermined electrical resistance (e.g., within a percentage such as 1-3% of a target electrical resistance).

Figure 11:
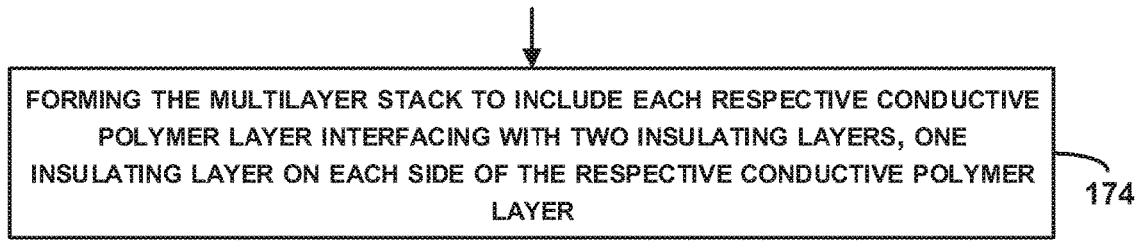
FIG. 11 is a flowchart of additional operations that may be performed with the method of FIG. 9, in accordance with an example implementation.

FIG. 11 is a flowchart of additional operations that may be executed and performed with the method 164, in accordance with an example implementation. At block 174, operations include forming the multilayer stack to include each respective conductive polymer layer interfacing with two insulating layers, one insulating layer on each side of the respective conductive polymer layer (e.g., the conductive polymer layer 108 interfacing with the insulating layers 102, 114, the conductive polymer layer 132 interfacing with the insulating layers 114, 136, and the conductive polymer layer 144 interfacing with the insulating layers 136, 148).

Figure 12:
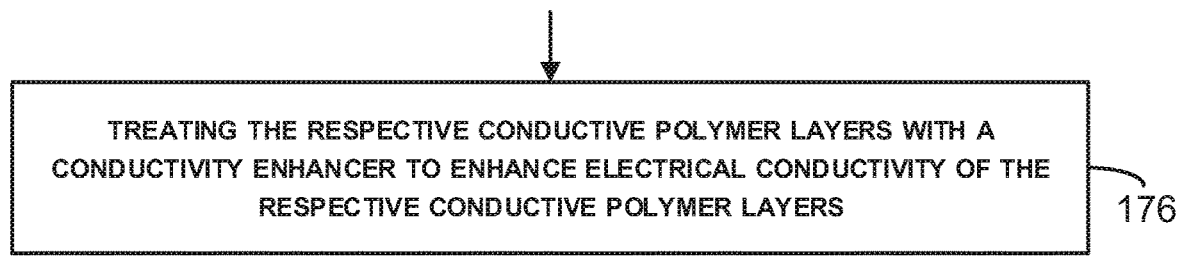
FIG. 12 is a flowchart of additional operations that may be performed with the method of FIG. 9, in accordance with an example implementation.

FIG. 12 is a flowchart of additional operations that may be executed and performed with the method 164, in accordance with an example implementation. At block 176, operations include treating the respective conductive polymer layers with a conductivity enhancer to enhance electrical conductivity of the respective conductive polymer layers. For example, treating the respective conductive polymer layers with the conductivity enhancer comprises treating the respective conductive polymer layers with IPA. In other examples, the respective conductive polymer layers may be treated with a band modifier to enhance electron hole mobility, and thus enhance electrical conductivity of the respective conductive polymer layers.

Figure 13:
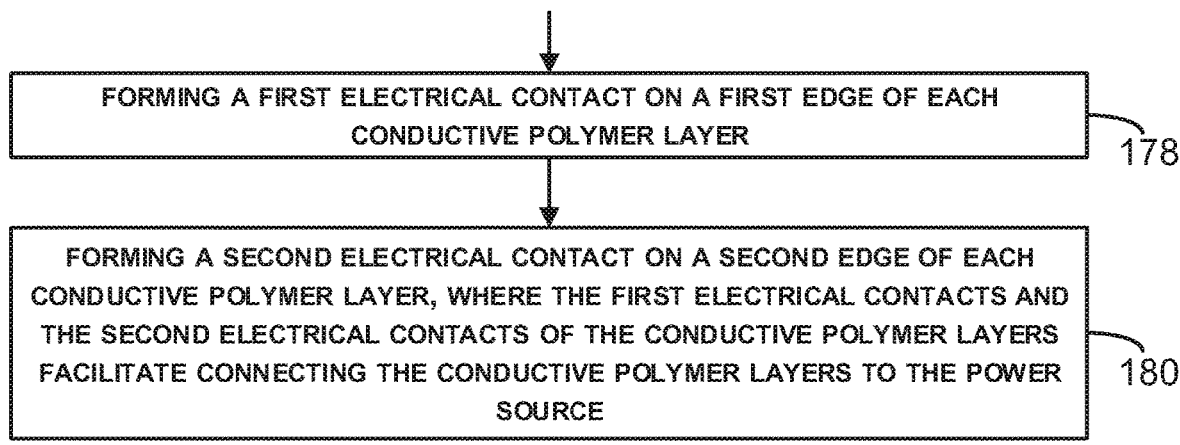
FIG. 13 is a flowchart of additional operations that may be performed with the method of FIG. 9, in accordance with an example implementation.

FIG. 13 is a flowchart of additional operations that can be executed and performed with the method 164, in accordance with an example implementation. At block 178, operations include forming a first electrical contact (e.g., first electrical contacts 118, 138, 150) on a first edge of each conductive polymer layer, and at block 180 operations include forming a second electrical contact (e.g., second electrical contacts 120, 140, 152) on a second edge of each conductive polymer layer. The first electrical contacts and the second electrical contacts of the conductive polymer layers facilitate connecting the conductive polymer layers to the power source.

Figure 14:
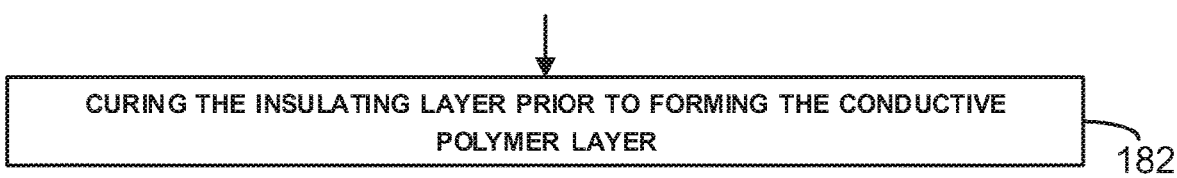
FIG. 14 is a flowchart of additional operations that may be performed with the method of FIG. 9, in accordance with an example implementation.

FIG. 14 is a flowchart of additional operations that can be executed and performed with the method 164, in accordance with an example implementation. At block 182, operations include curing the insulating layer prior to forming the conductive polymer layer. Curing can be partial or can be full depending on the application and implementation.

Figure 15:
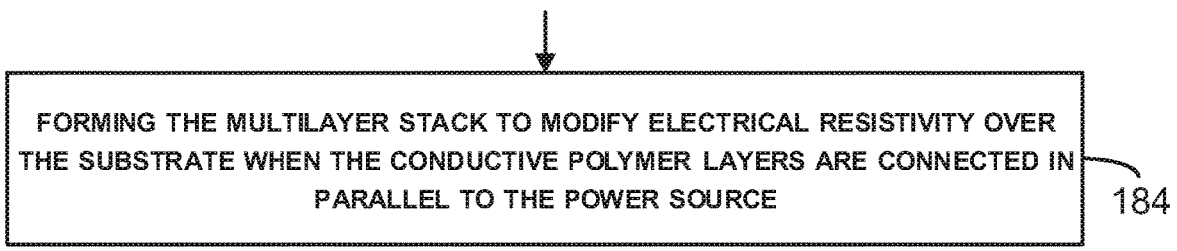
FIG. 15 is a flowchart of additional operations that may be performed with the method of FIG. 9, in accordance with an example implementation.

FIG. 15 is a flowchart of additional operations that may be executed and performed with the method 164, in accordance with an example implementation. At block 184, the operations of repeating deposition of a respective insulating layer, and formation of a respective conductive polymer layer to form a multilayer stack may include forming the multilayer stack to modify electrical resistivity over the substrate when the conductive polymer layers are connected in parallel to the power source. For example, forming the multilayer stack to modify the electrical resistivity over the substrate may include depositing a different number of layers at different locations on the substrate. In another example, forming the multilayer stack to modify the electrical resistivity over the substrate may include depositing conductive polymer layers having a different conductive polymer at different locations on the substrate. In another example, forming the multilayer stack to modify the electrical resistivity over the substrate may include depositing conductive polymer layers having different thicknesses at different locations on the substrate. In another example, conductive layers can selectively be treated with a conductivity enhancer while others might not be treated with a conductivity enhancer so as to vary electrical conductivity and resistivity across the substrate.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A method comprising:
   depositing an insulating layer on a substrate;
   forming a conductive polymer layer on the insulating layer; and
   repeating deposition of a respective insulating layer, and formation of a respective conductive polymer layer to form a multilayer stack of respective conductive polymer layers interposed between respective insulating layers, wherein each respective conductive polymer layer has a respective electrical resistance, and wherein the respective conductive polymer layers are electrically connected in parallel, such that a resultant electrical resistance of the respective conductive polymer layers is less than each respective electrical resistance, and wherein repeating deposition of a respective insulating layer, and formation of a respective conductive polymer layer to form the multilayer stack comprises forming the multilayer stack to modify electrical resistivity over the substrate, such that a first location over the multilayer stack has an electrical resistivity that is different from a respective electrical resistivity at a second location over the multilayer stack, wherein forming the multilayer stack to modify the electrical resistivity over the substrate comprises: (i) depositing a number of conductive polymer layers at the first location that is different from a respective number of conductive polymer layers at the second location in a longitudinal direction over the substrate, (ii) depositing conductive polymer layers having a type of conductive polymer at the first location that is different from a respective type of conductive polymer at the second location, or (iii) depositing conductive polymer layers having a thickness at the first location that is different from a respective thickness of conductive polymer layers at the second location.

2. The method of claim 1, wherein repeating the deposition of the respective insulating layer and the formation of the respective conductive polymer layer comprises:
   repeating the deposition of the respective insulating layer and the formation of the respective conductive polymer layer until the resultant electrical resistance is substantially equal to a predetermined electrical resistance.

3. The method of claim 1, wherein repeating deposition of a respective insulating layer, and formation of a respective conductive polymer layer to form a multilayer stack comprises forming the multilayer stack to include each respective conductive polymer layer interfacing with two insulating layers, one insulating layer on each side of the respective conductive polymer layer.

4. The method of claim 1, further comprising:
treating the respective conductive polymer layers with a conductivity enhancer to enhance electrical conductivity of the respective conductive polymer layers.

5. The method of claim 4, wherein treating the respective conductive polymer layers with the conductivity enhancer comprises treating with a morphology enhancer or band modifier.

6. The method of claim 1, further comprising:
forming a first electrical contact on a first edge of each conductive polymer layer; and
forming a second electrical contact on a second edge of each conductive polymer layer, wherein the first electrical contact and the second electrical contact of the conductive polymer layers facilitate connecting the conductive polymer layers to a power source.

7. The method of claim 1, wherein forming the conductive polymer layer comprises forming the conductive polymer layer to include an intrinsic or extrinsic conductive polymer.

8. The method of claim 1, wherein depositing the insulating layer comprises depositing a resin layer including polyurethane, epoxy, thermoplastic, phenolic, or silicone material.

9. The method of claim 1, wherein forming the conductive polymer layer comprises forming a layer of Polyaniline-Dinonylnaphthalene sulfonic acid (PANI-DNNSA), poly(ethylenedioxythiophene)-poly(styrenesulfonate) (PEDOT-PSS), Polyaniline-dodecylbenzene sulfonic acid (PANI-DBSA), polypyrrole, graphene paint, carbon nanotubes paint, carbon black, conductive oxide, or metallic particles.

10. The method of claim 1, further comprising:
curing the insulating layer prior to forming the conductive polymer layer.

11. A device comprising:
a substrate; and
a multilayer stack disposed on the substrate, wherein the multilayer stack comprises a plurality of conductive polymer layers, each conductive polymer layer being interposed between respective insulating layers, wherein each conductive polymer layer has a respective electrical resistance, wherein the plurality of conductive polymer layers are electrically connected in parallel, and wherein a number of conductive polymer layers of the plurality of conductive polymer layers at a first location over the substrate is different from a respective number of conductive polymer layers of the plurality of conductive polymer layers at a second location in a longitudinal direction over the substrate, such that an electrical resistivity at the first location over the multilayer stack is different from a respective electrical resistivity at the second location over the multilayer stack.

12. The device of claim 11, wherein the conductive polymer layers are treated with a conductivity enhancer to enhance electrical conductivity of the conductive polymer layers.

13. The device of claim 12, wherein the conductivity enhancer comprises a morphology enhancer or band modifier.

14. A component of an aircraft, the component comprising:
a multilayer stack disposed on or proximate to a surface of the component, wherein the multilayer stack comprises a plurality of conductive polymer layers, each conductive polymer layer being interposed between respective insulating layers, wherein each conductive polymer layer has a respective electrical resistance, wherein the plurality of conductive polymer layers are electrically connected in parallel to a power source, such that a resultant electrical resistance of the respective conductive polymer layers is less than each respective electrical resistance, and wherein a number of the conductive polymer layers of the multilayer stack at a first location of the component is different from a number of the conductive polymer layers of the multilayer stack at a second location in a longitudinal direction over the component so as to generate a different amount of heat at the first location over the multilayer stack compared to the second location over the multilayer stack.

15. The component of claim 14, wherein a number of conductive polymer layers of the plurality of conductive polymer layers is selected such that the resultant electrical resistance of the conductive polymer layers is substantially equal to a predetermined electrical resistance.

16. The device of claim 11, wherein the electrical resistivity at the first location over the multilayer stack is different from the respective electrical resistivity at the second location over the multilayer stack further based on a type of conductive polymer at the first location being different from a respective type of conductive polymer at the second location.

17. The device of claim 11, wherein the electrical resistivity at the first location over the multilayer stack is different from the respective electrical resistivity at the second location over the multilayer stack further based on a thickness of conductive polymer layers at the first location being different from a respective thickness of conductive polymer layers at the second location.

18. The device of claim 11, further comprising:
a first electrical contact disposed on a first edge of each conductive polymer layer; and
a second electrical contact on a second edge of each conductive polymer layer, wherein the first electrical contact and the second electrical contact facilitate connecting each conductive polymer layer to a power source.

19. The component of claim 14, wherein the conductive polymer layers are treated with a conductivity enhancer to enhance electrical conductivity of the conductive polymer layers.

20. The component of claim 19, wherein the conductivity enhancer comprises a morphology enhancer or band modifier.

* * * * *